United States Patent [19]

Cody et al.

[11] Patent Number: 4,584,631
[45] Date of Patent: Apr. 22, 1986

[54] INDIRECT LIGHTING FOR A VEHICLE

[75] Inventors: Michael J. Cody, Holland; Ronald A. Dykstra, Rockford, both of Mich.

[73] Assignee: Prince Corporation, Holland, Mich.

[21] Appl. No.: 662,229

[22] Filed: Oct. 18, 1984

[51] Int. Cl.⁴ ............................ B60Q 3/02; F21V 7/02
[52] U.S. Cl. ...................................... 362/61; 362/302; 362/350
[58] Field of Search .................... 362/61, 74, 236, 247, 362/297, 298, 302, 303, 346, 347, 350

[56] References Cited

U.S. PATENT DOCUMENTS

| | | | |
|---|---|---|---|
| 1,925,001 | 8/1933 | Penney | 362/256 |
| 1,954,978 | 4/1934 | Aldrich | 362/256 |
| 2,054,286 | 9/1936 | Greenmun | 362/256 |
| 2,058,139 | 10/1936 | Doane | 362/347 |
| 2,116,317 | 5/1938 | Marshall et al. | 362/74 |
| 2,116,324 | 5/1938 | Prance | 362/74 |
| 2,205,860 | 6/1940 | Olds | 362/256 |
| 2,853,595 | 9/1958 | Baldwin | 240/8.5 |
| 2,879,377 | 3/1959 | Laying | 362/256 |
| 3,205,351 | 9/1965 | Walker | 362/74 |
| 3,218,448 | 11/1965 | Cala | 240/8.2 |
| 3,312,814 | 4/1967 | Reading | 362/255 |
| 3,671,739 | 6/1972 | McCain | 362/74 |
| 4,037,096 | 7/1977 | Brendgord et al. | 362/298 |
| 4,210,954 | 7/1980 | Laser | 362/303 |
| 4,437,145 | 3/1984 | Roller et al. | 362/61 |

Primary Examiner—William A. Cuchlinski, Jr.
Attorney, Agent, or Firm—Price, Heneveld, Huizenga & Cooper

[57] ABSTRACT

An indirect lighting system includes a housing which defines an outwardly facing reflector. Coupled centrally to the reflector and spaced therefrom is a removable shield which, in one embodiment of the present invention, covers a light mounted to the center area of the reflector, and in another embodiment of the present invention, includes the light source itself. The light positioned behind the shield in either embodiment is reflected by the relatively large area defined by the reflective housing.

4 Claims, 7 Drawing Figures

INDIRECT LIGHTING FOR A VEHICLE

BACKGROUND OF THE INVENTION

The present invention relates to an automotive interior lighting system and particularly one which employs indirect lighting.

Vehicle courtesy lights commonly used in automobiles, trucks and the like typically are mounted to the roof of a vehicle to project light to the interior of the vehicle. Such lights, commonly referred to as dome lights, can be actuated by the opening of a vehicle door and/or by the manual operation of a switch. The light bulbs are typically mounted to a housing and covered by a plastic defusing plate or lens. Although such lights provide adequate interior lighting, they are not overly attractive, and the defusing covers and lenses frequently become discolored, dirty or the like which is unsightly and reduces the light emitted. Such lights also typically radiate light from a relatively small area and thus do not provide full and even illumination to the interior of the vehicle.

SUMMARY OF THE PRESENT INVENTION

The indirect lighting system of the present invention overcomes the difficulties encountered with existing courtesy lights by providing a housing which is adapted to be mounted to a vehicle and which defines an outwardly facing reflector. Coupled centrally to the reflector is a light reflecting shield which, in one embodiment of the present invention, covers a light mounted to the center area of the reflector, and in another embodiment of the present invention, includes the light source itself. The light positioned behind the shield in either embodiment is reflected by the relatively large area defined by the reflective housing.

In one embodiment of the invention, the reflective cover includes means for removably attaching the cover directly to a light bulb mounted to the housing, and in another embodiment of the present invention, the light bulbs are mounted to the cover and plug means extend from the cover and interengage a socket in the housing for providing electrical operating power to the bulbs.

With the indirect lighting of the present invention, therefore, an indirect light source is provided for illuminating the interior of a vehicle and one which provides ready access to the bulbs for replacement, if necessary. The resulting indirect light provides pleasant and effective illumination of the vehicle.

These and other objects, features and advantages of the present invention will become apparent upon reading the following description thereof together with reference to the accompanying drawings in which:

DETAILED DESCRIPTION OF THE PREFERRED EMBODIMENTS

Figure 1:
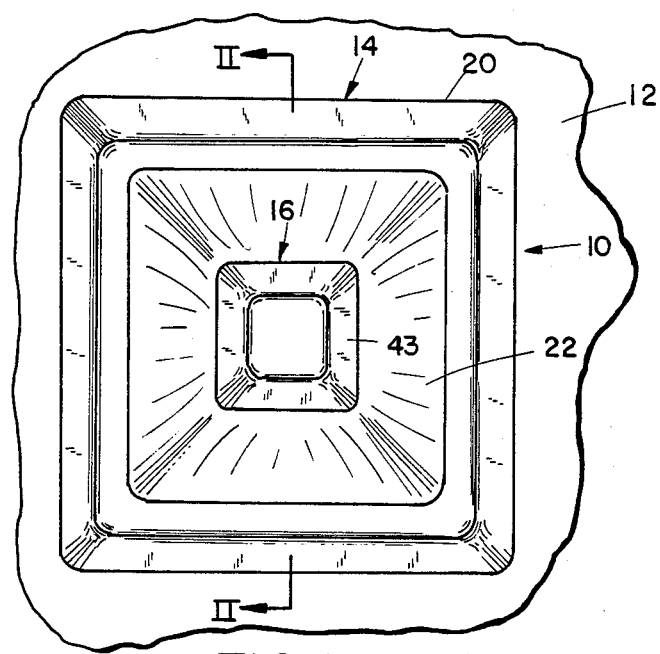
FIG. 1 is a plan view of one embodiment of the present invention.
Figure 2:
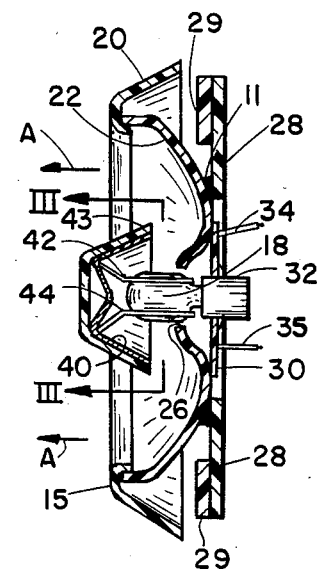
FIG. 2 is a cross-sectional view of the structure shown in FIG. 1.
Figures 3, 6:
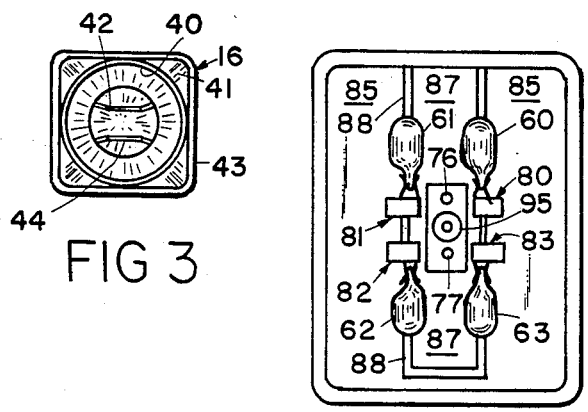
FIG. 3 is a plan view of the inside of the reflector cover shown in FIG. 1.
FIG. 6 is a plan view of the inside of the reflector cover shown in FIG. 4.
Figure 7:
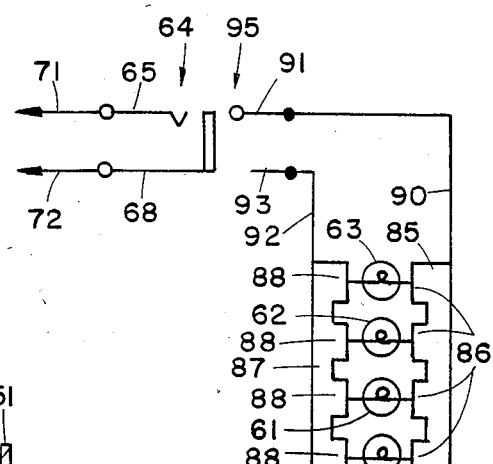
FIG. 7 is an electrical diagram in schematic form of the embodiment shown in FIGS. 4–6.

Referring initially to FIGS. 1–3, there is shown an indirect lighting assembly 10 which is mounted to the roof 12 of a vehicle to provide interior lighting for the vehicle. Assembly 10 includes a housing 14 and a removable reflector and shield 16 with an electrical lamp or bulb 18 interposed between the housing 14 and reflector 16 such that light can be reflected only indirectly into the vehicle. Housing 14 comprises a polymeric material such as a polycarbonate molded to define a square, decorative flange 20 extending around the periphery of the housing and a concave reflective surface 22 within the borders of the peripheral flange 20. The concave surface 22 can follow a parabolic curve in cross section, as shown in FIG. 2, with the housing including a central opening 26 (FIG. 2) such that lamp 18 can extend through the center of the housing. A circular, ring-shaped mounting plate 28 is bonded by a bonding agent 11 to the rear surface of housing 14. Mounting plate 28 includes radially spaced, tapered flanges 29 to provide a bayonet mounting structure for the housing 14. The vehicle roof accordingly will include a sheet metal structure having an opening with slots to receive the bayonet-type mounting structure in a conventional fashion.

Assembly 10 also includes a conventional printed circuit 30 also bonded to the rear surface of housing 14. Circuit 30 includes a conventional automotive twist-lock bulb socket 32 for receiving bulb 18 which may be a General Electric 922 wedge-base bulb. Coupled to printed circuit board 30 and socket 32 is a pair of electrical conductors 34 and 35 which are coupled to the vehicle's power system and typically the door actuated wires such that the courtesy light asembly 10 will be illuminated when the vehicle doors are opened.

Reflector or light shield 16 comprises a generally square cap 41 which is relatively small as compared to the size of housing 14. Cap 41 has a concave interior surface and is molded of a polymeric material such as a polycarbonate and includes a concave reflective element 40 mounted to its inner surface. Element 40 is a metallic reflector which directs illumination from lamp 18 toward the concave reflective surface 22 of housing 14 for subsequent reflection outwardly into the vehicle, as indicated by arrows A in FIG. 2. A pair of generally U-shaped spring wire clips 42 and 44 are coupled to the metallic reflective element 40 preferably by soldering and are spaced from one another a distance to compressibly engage and circumscribe the glass envelope of bulb 18, as illustrated in FIG. 2. The resilient spring clips 42 and 44 thus permit the reflector 16 to be removed from bulb 18 and the housing for easy replacement of the bulb.

In the preferred embodiment of the invention, the reflective surface 22 of the molded polymeric housing 14 was of a light reflective color such as white. It could also be coated with a metalized reflective surface, if desired, although generally a subdued light-colored matte surface provides a more pleasing light. The reflective element 40 of reflector 16, however, should provide both a highly reflective surface as well as a heat dissipative cap by providing a chrome-plated metallic mass, in the embodiment shown. The reflective element 40 can be glued in cap 41 by means of a suitable bonding agent.

As best seen in FIG. 2, the sidewalls 43 of cap 41 extend inwardly beyond the outer peripheral edge 15 of flange 20 of the housing. Thus, light from bulb 18 cannot shine directly from the bulb into the eyes of the vehicle occupants and can only be indirectly reflected by the concave surface 22 of housing 14.

In the alternative embodiment of the invention, shown in FIGS. 4–7, a concave housing 50 is also provided as is a removable reflector 70. Housing 50, in the alternative embodiment, also is molded of a suitable polymeric material such as polycarbonate and includes a peripheral trim flange 51 extending around the periphery of the generally rectangular structure. Like the first embodiment, housing 50 also includes a bonded mounting member 52 which is shaped to fit behind and under the peripheral flange 51 of housing 50. Member 52 includes a rear plate 53 which abuts against a suitable mounting bracket in the vehicle roof. Plate 53 includes a pair of spaced apertures 54 and 55 for receiving fastening screws, the heads of which extend through corresponding, aligned, but larger apertures 56 and 57 formed in the housing. The reflector 70 is naturally removed for mounting the housing 50 to the vehicle.

Figures 4, 5:
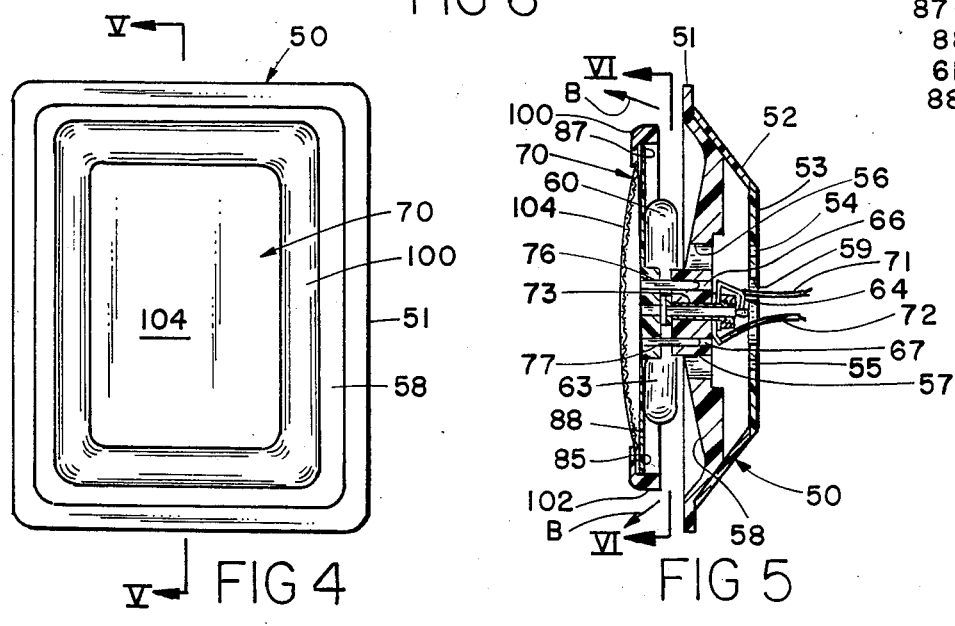
FIG. 4 is a plan view of an alternative embodiment of the present invention.
FIG. 5 is a cross-sectional view of the structure shown in FIG. 4 taken along section lines V—V of FIG. 4.

Housing 50 also includes a generally concave reflective surface 58 which may include a parabolic portion for reflecting light outwardly from the housing 50 in the direction indicated by arrows B in FIG. 5.

Housing 50 also includes a pair of apertures 66 and 67 formed in the center portion thereof and spaced from one another to align with and snugably receive a pair of guide pins 76 and 77 associated with reflector 70. Guide pins 76 and 77 are preferably made of metal and are integrally molded to the polymeric cap 100 of reflector 70. The pins, together with plug 95, provide a secure mechanical connection of the reflector 70 in housing 50 and yet permit removal of the reflector for replacement of the lamps.

Centrally mounted within housing 50 is a two-prong electrical jack or socket 64 having contacts 65 and 68 to which there is coupled a pair of electrical conductors 71 and 72 which extend through an aperture 59 in plate 53. Conductors 71 and 72 lead to the vehicle's elecrical system such as the door operated switches for providing operating power to conductors 71 and 72 when a vehicle door is opened. Jack 64 is a conventional miniature phonojack secured within a central aperutre 73 formed in housing 50 in a conventional manner. Surface 58 of housing 50 also is preferably a light color such as a matte white finish to provide sufficient reflectively of illumination from four light bulbs 60–63 mounted to the inside of reflector 70.

Reflector 70 includes lamps 60–63 which are wedge-type GE bulbs, type 158, mounted in a generally rectangular array, as best seen in FIG. 6. The bulbs are mounted in corresponding sockets 80–83 defined by a pair of configured metal plates 85 and 87 (FIGS. 5 and 7) each with four tabs 86 and 88, respectively, shaped to define the sockets 80–83. Plates 85 and 87 are thus of a conductive material preferably with a highly reflective finish to also provide reflection of light from lamps 60–63 to the reflective surface 58 of housing 50. To provide the desired socket arrangement, plates 85 and 87 are configured, as best seen in FIG. 6, with plate 85 being a generally U-shaped plate having a thin base section while plate 87 is generally an I-shaped structure.

Contacts 86 of plate 85 are Z-shaped with each pair of contacts forming the sockets extending from a facing edge in the legs of plate 85. Contacts 88 extend from opposite edges of plate 87. A generally U-shaped gap 88 (FIG. 6) electrically isolates plates 85 and 87. A pair of wires 90 and 92 (FIG. 7) couple plates 85 and 87 to plug contacts 91 and 93, respectively, of a two-prong phonoplug 95 which is positioned between support pins 76 and 77 of reflector 70 and aligned with socket 64 to electrically connect lamps 60–63 to conductors 71 and 72 through the lamp sockets and the jack and plug combination. Plates 85 and 87, in addition to providing electrical coupling of the lamps to conductors 90 and 92 and a reflective surface, also provide heat dissipation for the lamps. The plates are supported on a molded polymeric, concave-shaped cap 100 having an inwardly projecting peripheral lip 102. The outer side of cap 100 includes a central, rectangular area with an upholstered insert 104 conforming to the interior of a vehicle for providing a pleasing aesthetic appearance to the light.

Thus, with each of the embodiments, there is provided a housing which includes socket means electrically coupled to the vehicle's power system and a reflector or shield which covers the lamp(s) associated with the lighting system and directs illumination against a generally concave reflector contained in the housing. In each of the embodiments, the reflector or shield is removable for access to the lamps for replacement as necessary, and the housing is relatively large. In the first embodiment, each edge was about 6 inches while in the alternative embodiment, the rectangular housing was about 4¾ inches by 5⅜ inches.

It will become apparent to those skilled in the art that various modifications to the preferred embodiment as described herein can be made. In some embodiments, the removable reflector or shield may not have a reflective surface and therefore provide only a light shielding function. In some embodiments, different numbers and styles of light sources may be used. These and other modifications can be made without departing from the spirit or scope of the invention as defined by the appended claims.

The embodiments of the invention in which an exclusive property or privilege is claimed are defined as follows.

1. An indirect light for use in a vehicle comprising:
a housing having a concave reflective surface, said housing adapted to be mounted to a vehicle and including means for supplying electrical current to a light source;
a shield removably coupled to said housing;
a light source;
means including at least one socket mounted to said shield for electrically coupling said light source to said supplying means;
electrical connector means coupled to said shield and to said housing for electrically coupling said lamp socket to said means for supplying electrical current;
said light source positioned between said shield and said housing such that illumination from said light source is reflected into the vehicle by said reflective surface of said housing; and
said connector means comprises one of a plug or socket mounted to said shield in alignment with the other of a plug or socket mounted to said housing.

2. The apparatus as defined in claim 1 and further including a pair of spaced mechanical mounting pins extending from one of said shield or housing and aligned with and snugly received by a pair of spaced apertures formed in the other of said shield or housing to provide a removable mechanical connection of said shield to said housing.

3. An indirect light for use in a vehicle comprising:
   a housing having a concave reflective surface, said housing adapted to be mounted to the interior of a vehicle and including means for supplying electrical current to a light source;
   a shield removably coupled to said housing and spaced therefrom to provide a light transmitting opening adjacent the periphery of said shield;
   a light source;
   means including at least one socket mounted to one of said shield and housing for electrically coupling said light source to said supplying means; said socket and light source positioned between said shield and said housing such that illumination from said light source is reflected into the vehicle through said light transmitting opening by said reflective surface of said housing; and
   electrical connector means coupled to said shield and to said housing and arranged to electrically connect said lamp socket to said means for supplying electrical current, said connector means comprising one of a plug or socket mounted to said shield in alignment with the other of a plug or socket mounted to said housing.

4. The apparatus as defined in claim 3 and further including a pair of spaced mechanical mounting pins extending from one of said shield or housing and aligned with and snugly received by a pair of spaced apertures formed in the other of said shield or housing to provide a removable mechanical connection of said shield to said housing.

* * * * *